US011219111B2

(12) United States Patent
Lange

(10) Patent No.: US 11,219,111 B2
(45) Date of Patent: *Jan. 4, 2022

(54) SMART HEADLAMP SYSTEM USING INFRARED SENSING

(71) Applicant: Good Interfaces, Inc., New York, NY (US)

(72) Inventor: Justin Lange, New York, NY (US)

(73) Assignee: Good Interfaces, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/777,091

(22) Filed: Jan. 30, 2020

(65) Prior Publication Data

US 2020/0170092 A1    May 28, 2020

Related U.S. Application Data

(63) Continuation-in-part of application No. 16/402,592, filed on May 3, 2019, now Pat. No. 10,728,971.
(Continued)

(51) Int. Cl.
*H05B 47/13*    (2020.01)
*A42B 3/04*    (2006.01)
(Continued)

(52) U.S. Cl.
CPC ........... *H05B 47/13* (2020.01); *A42B 3/0446* (2013.01); *F21V 23/0471* (2013.01); *F21V 23/0492* (2013.01); *F21V 33/0008* (2013.01)

(58) Field of Classification Search
CPC . H05B 47/13; F21V 23/0471; F21V 23/0492; F21V 33/0008; A42B 3/0446; Y02B 20/40; F21L 4/00; F21Y 2115/10
See application file for complete search history.

(56) References Cited

U.S. PATENT DOCUMENTS

| 2,196,543 A | 4/1940 | Anderson |
| 2,964,613 A | 12/1960 | Schecter |

(Continued)

FOREIGN PATENT DOCUMENTS

| CN | 105090760 | 11/2015 |
| CN | 206302596 | 7/2017 |

(Continued)

OTHER PUBLICATIONS

Machine Translation of KR20100135987A (Year: 2011).*
(Continued)

*Primary Examiner* — Raymond R Chai
(74) *Attorney, Agent, or Firm* — Ryan, Mason & Lewis, LLP

(57) ABSTRACT

A smart headlamp system and methods of use thereof are provided herein. A computer-implemented method includes automatically measuring orientation values attributed to a lighting system device, which includes one or more lighting sources and one or more infrared radiation sensors, worn by a human user, automatically measuring infrared radiation values detected within a given proximity of the lighting system device, and automatically modulating one or more of the lighting sources based at least in part on the measured orientation values and the measured infrared radiation values.

18 Claims, 11 Drawing Sheets

Related U.S. Application Data

(60) Provisional application No. 62/733,272, filed on Sep. 19, 2018.

(51) Int. Cl.
*F21V 33/00* (2006.01)
*F21V 23/04* (2006.01)

(56) References Cited

U.S. PATENT DOCUMENTS

| | | |
|---|---|---|
| 3,087,049 A | 4/1963 | Schecter |
| 6,990,397 B2 | 1/2006 | Albou et al. |
| 7,124,008 B2 | 10/2006 | Brun et al. |
| 7,221,263 B2 | 5/2007 | Moore et al. |
| 7,293,893 B2 | 11/2007 | Kim |
| 8,529,086 B2 | 9/2013 | Skrivan et al. |
| 8,894,231 B2 | 11/2014 | Kwok |
| 9,227,555 B2 | 1/2016 | Kalapodas |
| 9,381,849 B2 | 7/2016 | Shibata |
| 10,028,356 B2 | 7/2018 | Luk et al. |
| 10,154,567 B2 | 12/2018 | Luk et al. |
| 10,728,971 B2 | 7/2020 | Lange |
| 2004/0240198 A1 | 12/2004 | Van Laar et al. |
| 2007/0274088 A1 | 11/2007 | Mertens et al. |
| 2011/0037419 A1 | 2/2011 | Hoffman et al. |
| 2012/0206050 A1 | 8/2012 | Spero |
| 2014/0035459 A1* | 2/2014 | Windom ............... H05B 45/00 315/33 |
| 2014/0070699 A1 | 3/2014 | Genthon et al. |
| 2014/0070700 A1 | 3/2014 | Genthon et al. |
| 2014/0210375 A1 | 7/2014 | Naumann |
| 2014/0309050 A1 | 10/2014 | Nell et al. |
| 2014/0336472 A1* | 11/2014 | Ferguson ............... A61B 90/30 600/249 |
| 2015/0003049 A1 | 1/2015 | Chang |
| 2015/0305111 A1 | 10/2015 | Bortolotti et al. |
| 2016/0033107 A1* | 2/2016 | Windom ............... F21V 5/006 362/184 |
| 2016/0221625 A1* | 8/2016 | Slaughter ............... B62J 6/02 |
| 2017/0051903 A1* | 2/2017 | Maglica ............... H05B 45/395 |
| 2017/0088036 A1 | 3/2017 | Roeckl et al. |
| 2018/0001814 A1 | 1/2018 | Salter et al. |
| 2018/0143006 A1* | 5/2018 | White ............... G06F 3/014 |
| 2018/0209628 A1 | 7/2018 | Maglica et al. |
| 2018/0224674 A1* | 8/2018 | Carabin ............... A61C 5/00 |
| 2019/0298479 A1* | 10/2019 | Eddy ............... F21V 21/084 |
| 2020/0008282 A1* | 1/2020 | Pereyra ............... G06T 7/0016 |

FOREIGN PATENT DOCUMENTS

| | | |
|---|---|---|
| EP | 1755453 A1 | 2/2007 |
| EP | 3133903 A3 | 3/2017 |
| EP | 2868162 B1 | 3/2019 |
| FR | 3049332 A1 | 9/2017 |
| KR | 20100135987 A * | 12/2010 |
| TW | 201542960 | 11/2015 |
| WO | 2005110220 | 11/2005 |
| WO | 2013191540 A1 | 12/2013 |
| WO | 2014001965 | 1/2014 |
| WO | 2016201597 | 12/2016 |

OTHER PUBLICATIONS

Deokar et al., Smart Helmet for Coal Mines Safety Monitoring and Alerting, International Journal of Advanced Research in Computer and Communication Engineering, vol. 6, Issue 7, Jul. 2017.
Petzl.com, Duo-S, https://www.petzl.com/US/en/Sport/SPECIALIZED-headlamps/DUO-S, Downloaded May 3, 2019.
Wilson, D., Beneath the Waves, Thermal versus Near Infrared, Jan. 2, 2018.

* cited by examiner

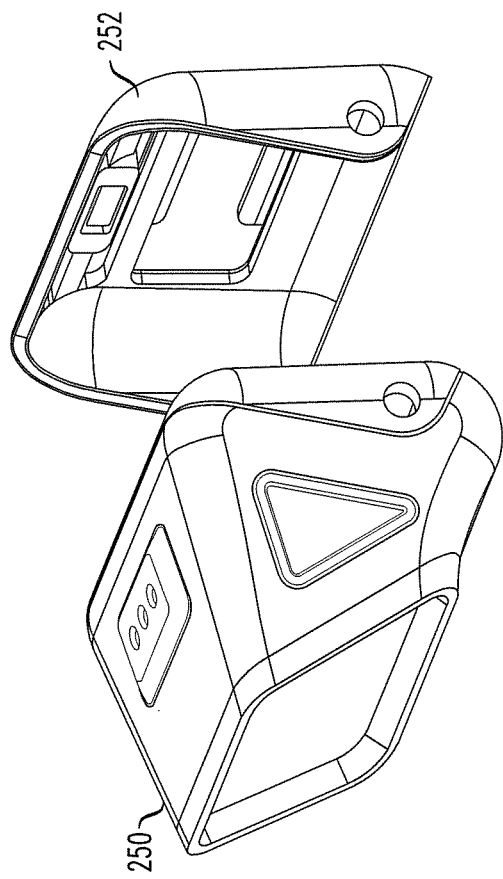
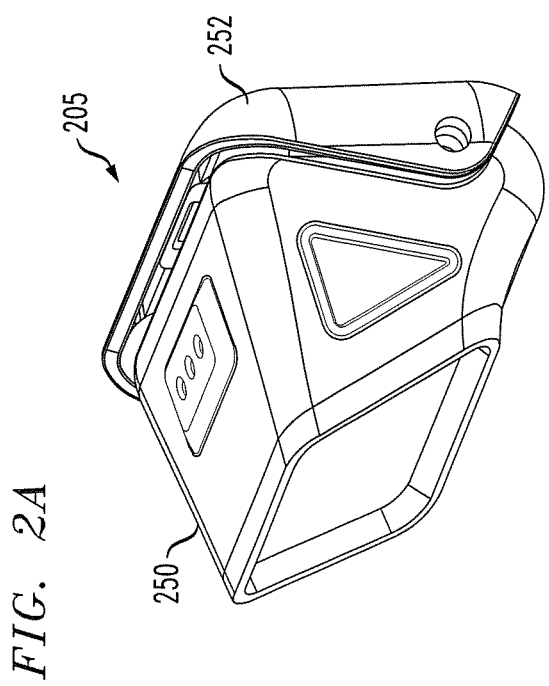
FIG. 2B
FIG. 2A

USER HEAD TILTED UPWARDS AND
NO IR DETECTED: LIGHT IS ON

USER HEAD TILTED UPWARDS
AND IR DETECTED: LIGHT IS ON

USER HEAD IS NEUTRAL AND
NO IR DETECTED: LIGHT IS ON

USER HEAD IS NEUTRAL AND
IR DETECTED: LIGHT IS OFF

USER HEAD IS TILTED DOWNWARDS
AND NO IR DETECTED: LIGHT IS ON

USER HEAD IS TILTED DOWNWARDS
AND IR DETECTED: LIGHT IS ON

SMART HEADLAMP SYSTEM USING INFRARED SENSING

CROSS-REFERENCE TO RELATED APPLICATIONS

The present application is a continuation-in-part of U.S. patent application Ser. No. 16/402,592, filed May 3, 2019, entitled "Smart Headlamp System," and claims priority to U.S. Provisional Application Ser. No. 62/733,272, filed Sep. 19, 2018, each incorporated by reference herein.

FIELD

The field relates generally to illumination technology, and more particularly to headlamp technology.

BACKGROUND

Headlamps are commonly used in many contexts, such as mining, firefighting, mountain climbing, camping, night-fishing, etc. However, when using conventional headlamps, a consistent issue exists in that users easily and/or routinely shine the light of their headlamps into the eyes of the other users. Being temporarily blinded and/or distracted by a headlamp can be annoying and/or potentially dangerous for a variety of users such as firefighters, industrial workers, climbers, etc.

Accordingly, a need exists for a headlamp solution that avoids these directional illumination issues.

SUMMARY

Illustrative embodiments of the invention provide a smart headlamp system using infrared (IR) sensing and methods of use thereof. An exemplary computer-implemented method includes automatically measuring orientation values attributed to a lighting system device worn by a human user, wherein the lighting system device comprises one or more lighting sources and one or more infrared radiation sensors. Additionally, such a method also includes automatically measuring infrared radiation values detected within a given proximity of the lighting system device, and automatically modulating one or more of the lighting sources based at least in part on (i) the measured orientation values and (ii) the measured infrared radiation values.

An exemplary apparatus can include one or more lighting sources, one or more power sources, one or more orientation sensors, one or more infrared radiation sensors, at least one memory, and at least one processor operably coupled to the at least one memory, the one or more orientation sensors and the one or more infrared radiation sensors. In such an apparatus, the at least one processor is configured for automatically measuring, via the one or more orientation sensors, orientation values attributed to the apparatus; automatically measuring, via the one or more infrared radiation sensors, infrared radiation values detected within a given proximity of the apparatus; and automatically modulating one or more of the lighting sources based on the measured orientation values and the measured infrared radiation values.

Illustrative embodiments can provide significant advantages relative to conventional headlamps. For example, challenges associated with shining light into another person's eyes during an interaction are overcome through automatically modifying the intensity level of light being emitted by a headlamp based on the head inclination of the wearing user, facilitating such interactions with other individuals as well as activities not involving other humans.

These and other illustrative embodiments described herein include, without limitation, methods, apparatus, networks, systems and processor-readable storage media.

BRIEF DESCRIPTION OF THE DRAWINGS

FIG. 2A and FIG. 2B are diagrams illustrating side angles of a smart headlamp system in an example embodiment of the invention;

DETAILED DESCRIPTION

Figure 1:
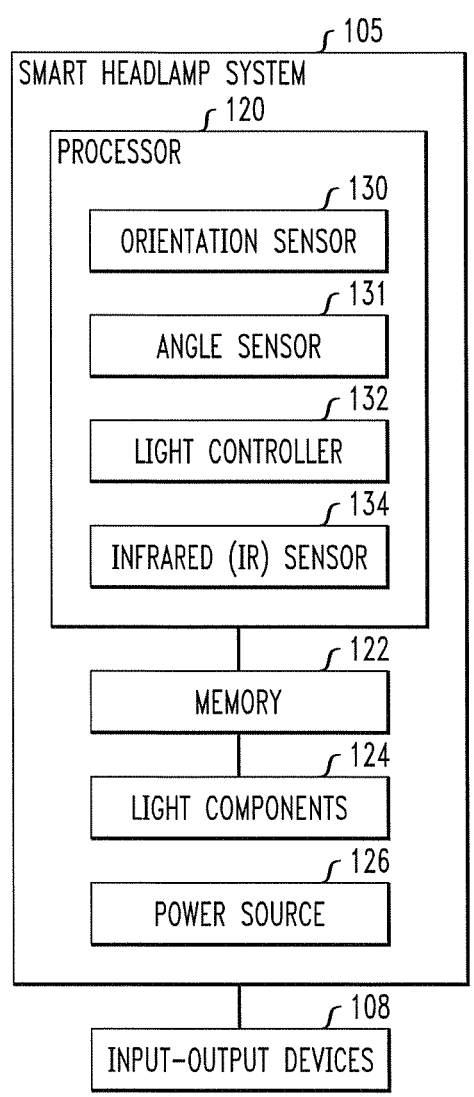
FIG. 1 is a block diagram of a smart headlamp system in an example embodiment of the invention.

As detailed herein, one or more embodiments of the invention include a smart headlamp system (also referred to herein as "LoBeams") that can automatically modify illumination intensity, directionality, and/or color based on headlamp orientation and infrared sensing. For example, one or more embodiments of the invention can include implementation of an accelerometer to assist in automatically detecting when a user/wearer of a smart headlamp system positions his or her head in a manner that is indicative of looking at someone's face. In such an embodiment, the smart headlamp system can automatically dim the headlamp illumination level/intensity to avoid shining the headlight (too brightly) into the eyes of the other person. Further, such an embodiment can additionally include increasing the headlamp illumination level/intensity upon detection that the user's/wearer's head position has changed in such a manner that is indicative of the user no longer looking at someone's face (for example, the user's head is angled down indicating that the user is looking at the ground and/or navigating, the user is looking at his or her hands, etc.).

Additionally, in connection with one or more embodiments, it is noted that human beings emit infrared radiation via heat (e.g., body heat). Accordingly, such an embodiment includes incorporating one or more pyroelectric detectors and/or sensors to detect the likely presence of another human being via detection of IR radiation (e.g., associated with body heat being emitted by another human being) within a given field and/or range of the lighting system device (i.e., smart headlamp system).

Also, in at least one embodiment, one or more such pyroelectric/IR detectors and/or sensors can be calibrated to exclusively detect a specific band or subset of infrared radiation values (e.g., mid-infrared radiation values). Further, as additionally detailed herein, one or more embodiments include incorporating and/or utilizing one or more IR transmissive telescopic lenses (or lens arrays). Such a lens can include, for example, a high-density polyethylene optical element. Also or alternatively, one or more embodiments including implementing a telescopic mid-IR transmissive lens array, such an array comprising optical elements transmissive to infrared energy (e.g., IR energy emitted by at least one human body). Such an array of optical elements can also narrow the field of view of the sensor and increase its sensitivity to radiation that is far away, akin to a telescope.

Accordingly, and as further detailed herein, one or more embodiments include incorporating (into a smart lighting system device) the ability to sense the presence of one or more humans within a given proximity of the smart lighting system device. Such an ability is implemented via incorporation of one or more IR sensors. Such IR sensors can include, for example, sensors that can convert detection of infrared radiation values (e.g., mid-IR values) into electrical current. By way merely of example, indium and antimony (e.g., p+, p– and/or n+ doped InSb) on a silicon-gallium arsenide (SI-GaAs) substrate can be used to detect IR because the sensitivity of these elements overlaps with the mid-IR energy radiated by humans.

Additionally, in one or more embodiments, the one or more IR sensors provide (to the smart lighting system device) a stream of IR and temperature readings to a micro-controller unit (MCU) of the smart lighting system device. Also, in such an embodiment, one or more Fresnel lenses made from high-density polyethylene (HDPE) or other similar material that allows IR energy to pass focuses the incoming energy such that the effective field of view of the IR sensor(s) (typically approximately 50 degrees) is approximately 5 degrees or less. In at least one embodiment, the incoming IR and/or heat energy is focused (by the IR sensor(s)) into a field of view that matches the field of view corresponding to the angle of the focused beam(s) of the primary beam(s)/light source(s) of the headlamp/smart lighting system device.

Consequently, in one or more embodiments, with the addition of the IR sensor(s), LoBeams is able to be "on" at all times except when the user's head (that is, the head of the user wearing the headlamp) is in a neutral position (i.e., facing forward at eye-level) and another human being is detected (via the one or more IR sensors) within the beam of the primary light source(s) of the headlamp. By way of illustration and example, such a situation is detailed below in connection with FIG. 10. Accordingly, based at least in part on readings coming from one or more orientation sensors as well as readings coming from the one or more IR sensors, the MCU of the smart lighting system device turns the primary light source(s) on or off according to a set of rules (such as illustrated, for example, in FIG. 10).

By way merely of example, in settings in a temperate climate, the human face is typically the warmest apparent area of the human body. As such, in one or more embodiments, the headlamp can continue to function (that is, the primary light source(s) can remain on) even if the user's head is in a neutral position and a part of another human body other than the face is detected.

FIG. 1 shows a smart headlamp system 105 that in the FIG. 1 embodiment can be implemented using at least one processing device. Each such processing device can include at least one processor and at least one associated memory, and can implement one or more functional software modules or components for controlling certain features of the smart headlamp system 105.

In the example embodiment of the invention illustrated in FIG. 1, the smart headlamp system 105 includes a processor 120 coupled to a memory 122, light components 124 (which can include, for example, various light-emitting diodes (LEDs)), and a power source 126 (which can include, for example, one or more batteries, such as AAA batteries).

The processor 120 can include, for example, a microprocessor, a microcontroller, an application-specific integrated circuit, a field-programmable gate array or other type of processing circuitry, as well as portions or combinations of such circuitry elements.

The memory 122 can include, for example, random access memory (RAM), read-only memory (ROM) or other types of memory, in any combination. The memory 122 and other memories disclosed herein can also be viewed as examples of processor-readable storage media, which can store executable computer program code and/or other types of software programs.

Examples of such processor-readable storage media can include, by way merely of example and not limitation, a storage device such as a storage disk, a storage array or an integrated circuit containing memory, as well as a wide variety of other types of computer program products. The term "processor-readable storage media" as used herein should be understood to exclude transitory, propagating signals.

Also associated with the smart headlamp system 105 are input-output devices 108, which can include, by way merely of example, keyboards, displays or other types of input-output devices in any combination. Such input-output devices can be used to support one or more user interfaces (UIs) to the smart headlamp system 105, as well as to support communication between the smart headlamp system 105 and other related systems and devices not explicitly illustrated in FIG. 1.

Referring again to the depiction of smart headlamp system 105, the processor 120 can also include orientation sensor 130, angle sensor 131 (which can include functionality performed by a hall effect sensor and a magnet, as further detailed herein), light controller 132, and at least one IR sensor 134. As further detailed herein, the orientation sensor 130 can include, for example, one or more accelerometers, which determine the orientation and/or angle of the smart headlamp system 105 (which can be dictated by the head pose and/or orientation of the human user wearing the smart headlamp system 105). In one or more embodiments, at least two of an accelerometer, a gyroscope, and a magnetometer are utilized/implemented in combination (as the orientation sensor 130, for example). An example combination of two or more of the above sensors can also be referred to herein as an inertial measurement unit (IMU).

Additionally, the light controller 132 can activate and/or de-activate one or more of the light components 124 (such as LEDs) based on the measurements and/or detections of the orientation sensor 130 and the at least one IR sensor 134. In one or more embodiments of the invention, the activations and/or deactivations of one or more of the light components 124 can encompass multiple predetermined modes of operation for the smart headlamp system 105. In such an embodiment, the light controller 132 can toggle the smart headlamp system 105 between the predetermined modes of operation based on the measurements and/or detections of the orientation sensor 130 and the at least one IR sensor 134.

It is to be appreciated that this particular arrangement of modules 130, 131, 132 and 134 illustrated in the processor 120 of the FIG. 1 embodiment is presented by way of example only, and alternative arrangements can be used in one or more other embodiments of the invention. For example, the functionality associated with the modules 130, 131, 132 and 134 in other embodiments can be combined into a single module, or separated across a number of modules. By way of further example, multiple distinct processors can be used to implement different ones of the modules 130, 131, 132 and 134, or portions thereof.

Also, at least portions of the orientation sensor 130, angle sensor 131, light controller 132, and at least one IR sensor 134 can be implemented at least in part in the form of software that is stored in memory 122 and executed by processor 120.

By way of example, in one or more embodiments of the invention, the processor 120 can request data from the orientation sensor 130 and the at least one IR sensor 134 on a periodic and/or consistent basis (for example, the processor can request data from the orientation sensor ten times per second, thirty times a second, one hundred times per second, etc.). The process can, for example, adjust the received orientation-related data in connection with one or more motion filtering mechanisms (with as little operational latency as possible), and the mode of the smart headlamp system can be adjusted via the light controller 132 based on the filtered data and the received IR data. Such motion filtering, in one or more embodiments of the invention, can include, for example, implementing a low-pass filter.

Additionally, one or more embodiments can include combining signals from two or more orientation sensors 130. Such an action can be referred to as motion fusion, which is implemented, for example, using filters such as Mahony and/or Madgwick filters, which includes using two or more orientation sensors and combining the signals therefrom together in a way that is robust to interference or drift. Also, at least one embodiment can include using multiple orientation sensors simultaneously. In such an embodiment, the filtering and/or combining of the signals is carried out via processor 120 (also referred to in one or more embodiments as an MCU) and/or via a digital motion processor (DMP) that is housed in an integrated circuit (IC) of the orientation sensor(s) 130 (such as one or more IMUs), which processes the signals prior to the signals being transmitted to an MCU.

Further, an example process utilizing orientation sensor 130, IR sensor(s) 134, and light controller 132 of the smart headlamp system 105 is described below, including in connection with the description of FIG. 12.

It is to be understood that the particular set of elements shown in FIG. 1 is depicted by way of illustrative example only, and in one or more other embodiments of the invention, additional or alternative elements may be used.

FIG. 2A and FIG. 2B are diagrams illustrating side angles of a smart headlamp system in an example embodiment of the invention. By way of illustration, FIG. 2A and FIG. 2B depict a main assembly 250 and a ratcheting cradle 252 of smart headlamp system 205. By way merely of example, the main assembly 250 and ratcheting cradle 252 can be composed of acrylonitrile butadiene styrene and polycarbonate (ABS+PC) or other plastic material. As detailed further herein, the ratcheting cradle 252 includes, in one or more embodiments, multiple stops (also referred to herein as detents) to segment and/or partition the rotation of the main assembly 250 into discrete increments.

Figure 3:
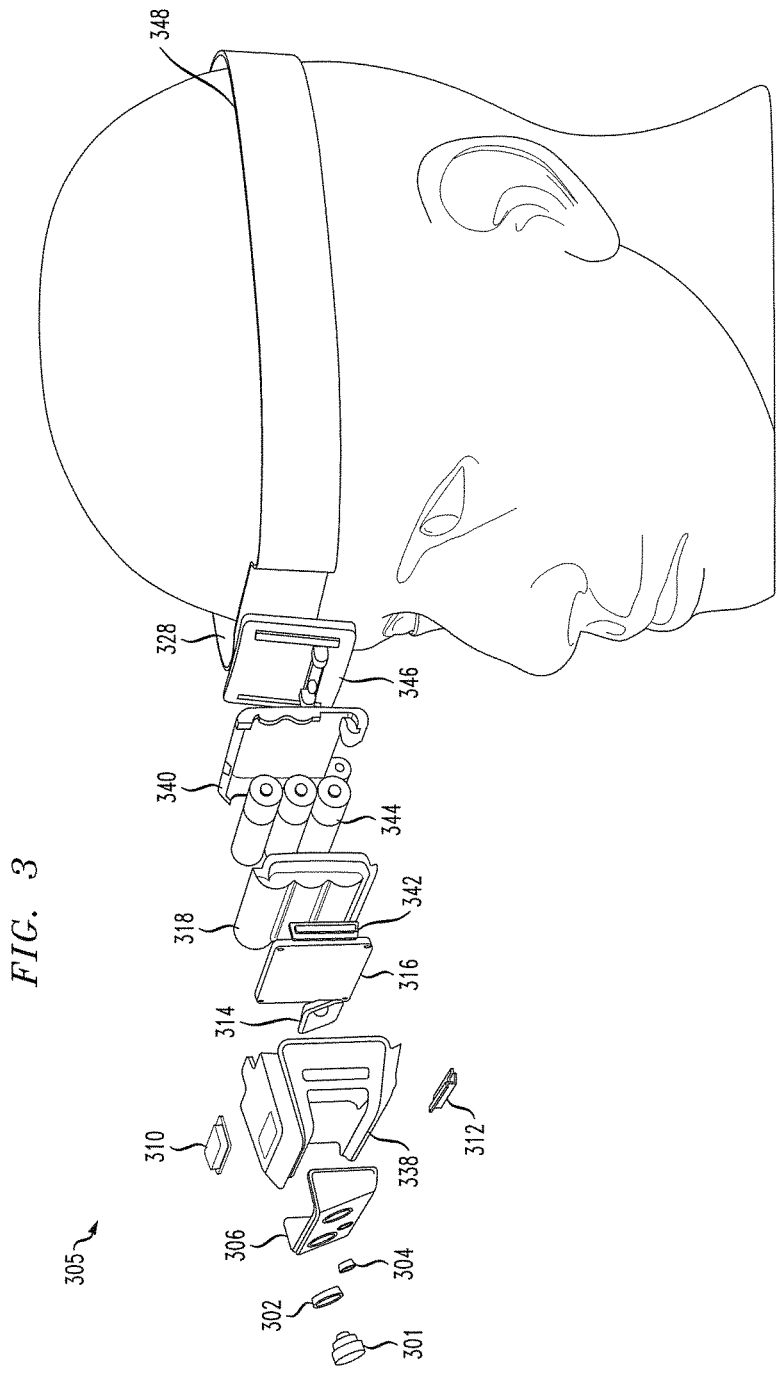
FIG. 3 is a diagram illustrating an exploded view of smart headlamp system hardware components in an example embodiment of the invention.

FIG. 3 is a diagram illustrating an exploded view of smart headlamp system hardware components in an example embodiment of the invention. By way of illustration, FIG. 3 depicts an IR-transmissive lens array 301 (e.g., a mid-IR transmissive telescopic lens array), a first (larger) secondary light diffuser 302 (translucent lens) and a second (smaller) secondary light diffuser 304 (translucent lens). Additionally, FIG. 3 depicts a front cover component 306 (which can be, for example, a back-painted clear front cover), a housing 338 (for example, with a color accent over-mold), an on/off button 310 (for example, a soft-touch thermoplastic elastomer (TPE) that is water-proof sealed), and a (red) tinted down-light lens 312 (which can be, for example, water clear and/or tinted red).

Also, FIG. 3 depicts a parabolic spot light reflector 314 (which can be, for example, water clear), a printed circuit board assembly (PCBA) 316 with surface mounted diode (SMD) light sources, and a side-mounted mode button 342 (which can include, for example, a soft-touch TPE that is water-proof sealed). Further, FIG. 3 depicts a rear housing and/or battery box 318 (which can include, for example, a hinge), a battery door 340 (which can include, for example, a mating hinge in relation to the rear housing/battery box 318), and one or more batteries 344 (such as, for example, AAA batteries).

As also illustrated, FIG. 3 depicts a headband bracket 346 (for example, with a ratchet feature), a textile headband 328 (optionally with printed graphics, for example), and a headband coupler buckle 348 (not explicitly shown).

Figure 6:
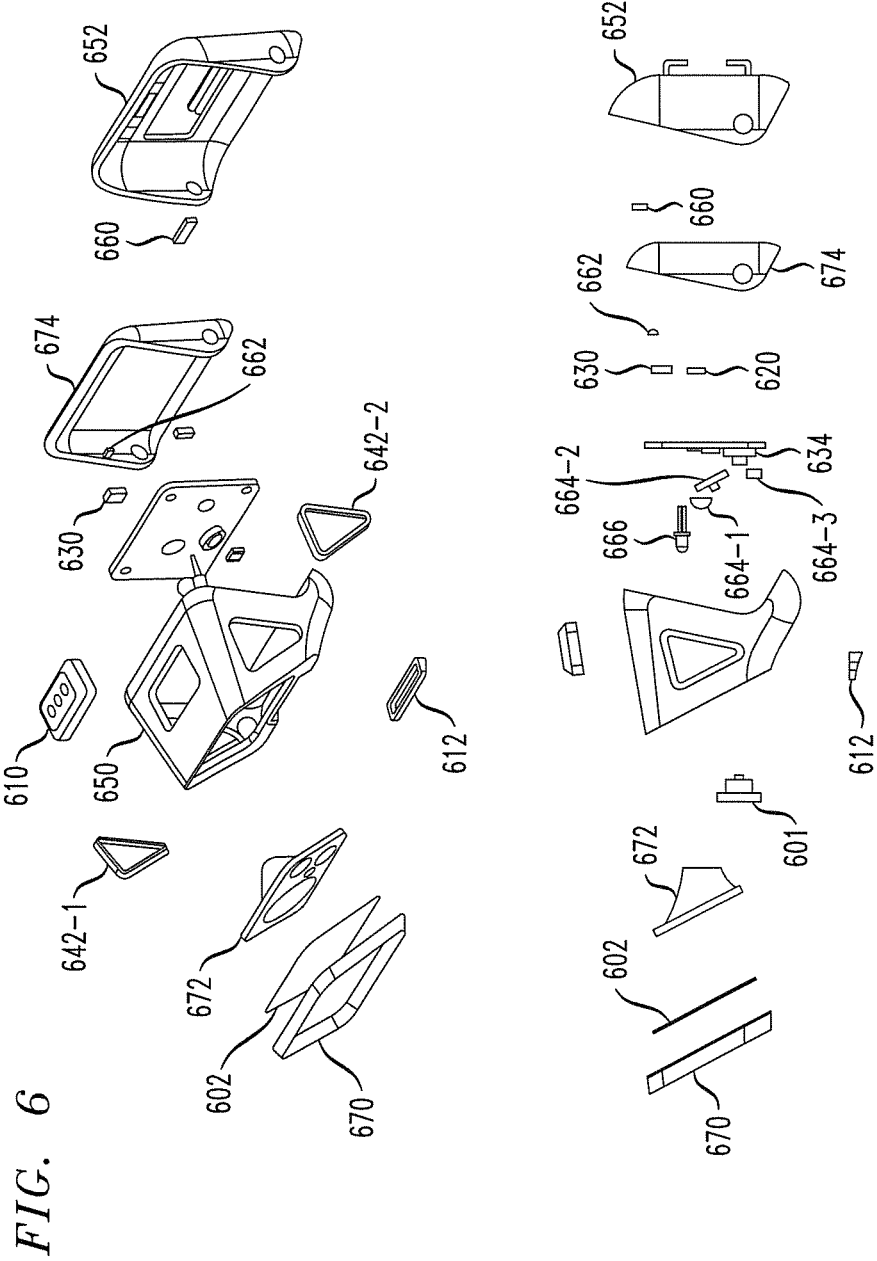
FIG. 6 is a diagram illustrating exploded views of smart headlamp system hardware components in an example embodiment of the invention.

In one or more embodiments, button 310 can include an on/off functionality and/or can also encompass a multimodal user interface (UI) switch, which can be included as one or more buttons. In an example embodiment, one button for power (on/off) is included and one button for manual mode selection is included. Additionally, in at least one embodiment, texture can be incorporated on such buttons to facilitate distinction between the buttons from a tactile perspective of the user. For example, an example embodiment (such as depicted in FIG. 6 via top button 610) can include a single button featuring multiple (e.g., three) bumps for texture/grip/feel.

Further, in one or more embodiments of the invention, a given number (such as two) of taps of the power button can turn off the smart headlamp system, while an additional given number of taps of the power button turns the smart headlamp system back on. Also, in one or more embodiments, pressing one button effects how one or more other buttons function. Such an embodiment additionally includes a calibration procedure related to assigning one or more specific functions to one or more specific buttons.

Figure 4:
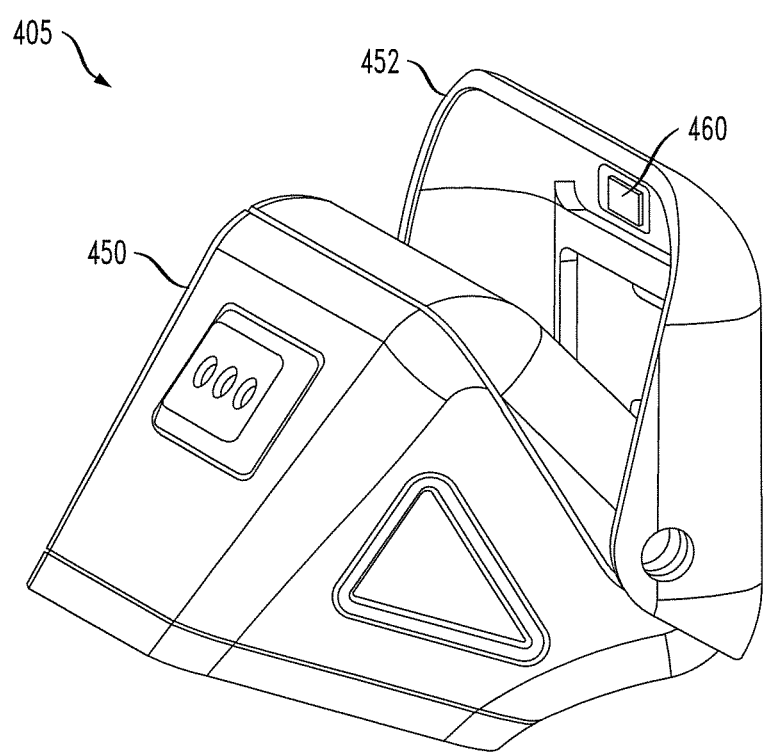
FIG. 4 is a diagram illustrating a side angle of a smart headlamp system in an example embodiment of the invention.

FIG. 4 is a diagram illustrating a side angle of a smart headlamp system in an example embodiment of the invention. By way of illustration, FIG. 4 depicts a magnet 460 positioned within the ratcheting cradle 452 of smart headlamp system 405. As further depicted and described herein, the ratcheting cradle 452, in one or more embodiments, carries a hall effect sensor (which is positioned within the main assembly 450 but not explicitly illustrated in FIG. 4) farther from the magnet 460. By way of example, the more downward that the smart headlamp system 405 points, the farther the distance between the magnet 460 and hall effect sensor.

By way of example, in one or more embodiments, by engaging a calibration routine, the smart headlamp system takes a reading of the angle of the system 405 when the user is resting his or her head at a neutral spine position. This calibration value is then stored in memory (of system 405). The ratcheting cradle 452 carries the hall effect sensor farther away from the magnet 460, reducing the field strength measured by the hall effect sensor. That is, the more downward that the smart headlamp system 405 points, the farther the distance between the magnet 460 and the hall effect sensor. By comparing the measured field strength to a look-up table of field strengths measured at various increments of the ratcheting cradle 452, at least one embodiment can determine the present angle of the ratcheting cradle 452. Because the ratcheting cradle 452 (containing the magnet 460) is affixed to the user's head by an elastic band, by subtracting the angle of the ratcheting cradle 452 from the angle of the main assembly 450 determined by the IMU, and further subtracting the calibration value previously stored in memory, the absolute angle of the user's head can be determined.

In at least one embodiment, to ensure a reliable user experience regardless of the actual angle of the ratcheting cradle 452, this absolute angle of the user's head is used throughout the system's calculations in determining when to turn-on (or intensify) and turn-off (or dim) one or more lights in conjunction with the LoBeams routine such as described herein, as well as to override such methods.

A hall effect sensor, as further detailed herein, detects the field strength of the magnet 460, which varies at each detent of the ratcheting cradle 452. In one or more embodiments, the angle at each detent is stored, and the angle of the current detent is calculated by comparing the measured field strength of the magnet 460 to a table of values stored in memory (as noted above).

Figure 5A:
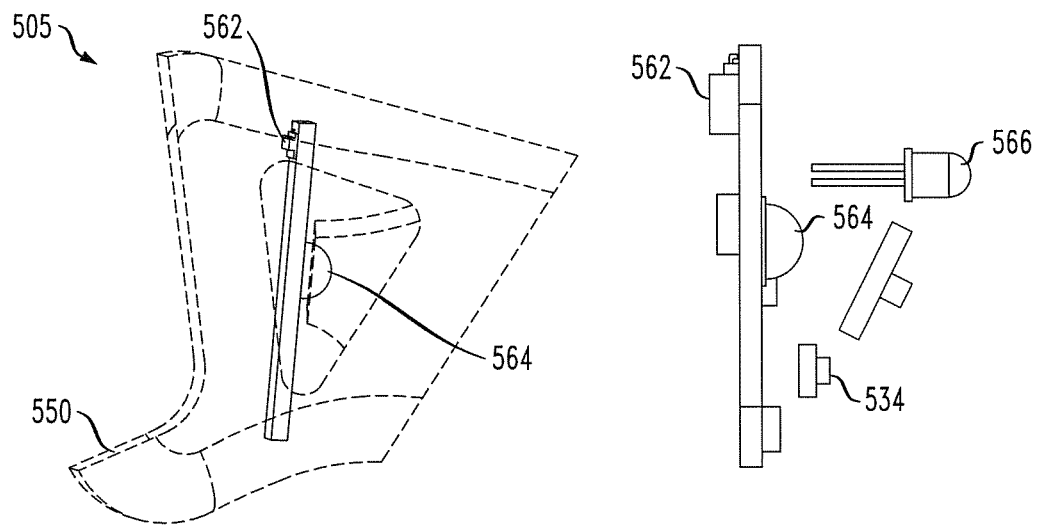
FIG. 5A and FIG. 5B are diagrams illustrating transparent views of side angles of a smart headlamp system in an example embodiment of the invention.
Figure 5B:
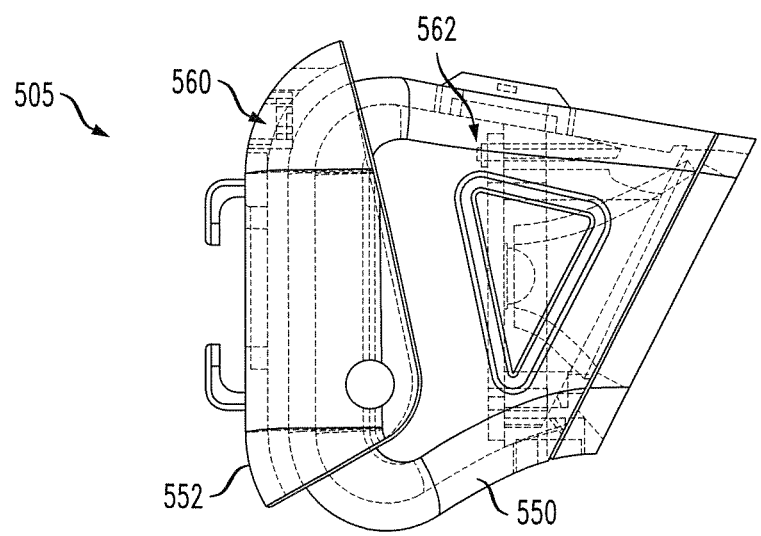

FIG. 5A and FIG. 5B are diagrams illustrating transparent views of side angles of a smart headlamp system in an example embodiment of the invention. By way of illustration, FIG. 5A depicts a main assembly 550 of smart headlamp system 505, and within main assembly 550 is depicted hall effect sensor 562, IR sensor 534, LED 564, and (optionally) photo detector 566 (all of which are illustrated in a side profile of a PCB in FIG. 5A). For example, the IR sensor 534 can encompass a surface mount technology (SMT) component. By way of illustration, FIG. 5B depicts main assembly 550 (within which is depicted hall effect sensor 562) and ratcheting cradle 552 (within which is depicted magnet 560).

One or more embodiments of the invention, in conjunction with and/or in lieu of implementing one or more hall effect sensors, can include implementing one or more other short range sensing techniques/mechanisms such as, for example, an IR detector, an ultrasonic range finder, one or more mechanical reed switches, a rotary encoder interfacing with the ratcheting cradle (such as 552 in FIG. 5B), a time of flight sensing apparatus, etc. Accordingly, such embodiments can include implementing any sensing system that measures, for example, the distance between the buckle and/or face plate of a smart headlamp system and the main assembly (such as 550 in FIG. 5A and FIG. 5B) for the purposes of determining the relative angle between the main assembly 550 and the ratcheting cradle 552 for the purposes of determining the overall angle between the main assembly 550 and the user's forehead. In one or more embodiments, such a determination can be carried out in conjunction with an individual offset value achieved through a calibration routine initiated by the user, wherein the anatomical angle of the user's forehead is calculated, and this calculated value is stored in memory. Accordingly, in such an embodiment, the system 505 detects the user's head angle, and in particular, the variance of the user's head angle from the state of a neutral spine position, which can be considered the natural state of a user looking forward without looking up or down.

FIG. 6 is a diagram illustrating exploded views of smart headlamp system hardware components in an example embodiment of the invention. By way of illustration, FIG. 6 depicts a front bevel component 670, a diffuser 602, an LED mount 672 (which includes an opening which interfaces with IR-transmissive lens array 601), side buttons 642-1 and 642-2, a top button 610, main assembly 650, an IMU 630, hall effect sensor 662, rear housing 674, magnet 660, and ratcheting cradle 652. As detailed herein, in one or more embodiments, the IMU 630 can include an accelerometer with one or more additional sensors (such as a gyroscope and/or a magnetometer), with or without an onboard processor, and such an IMU measures a body's specific force and angular rate, and/or the magnetic field surrounding the body.

Additionally, FIG. 6 depicts the IR-transmissive lens array 601 (e.g., a mid-IR transmissive telescopic lens array), downward-facing lens 612, photo detector 666, processor 620 as well as main (forward-facing) LED 664-1, red (forward-facing) LED 664-2, red (downward-facing) LED 664-3, and at least one IR sensor 634.

Figure 7:
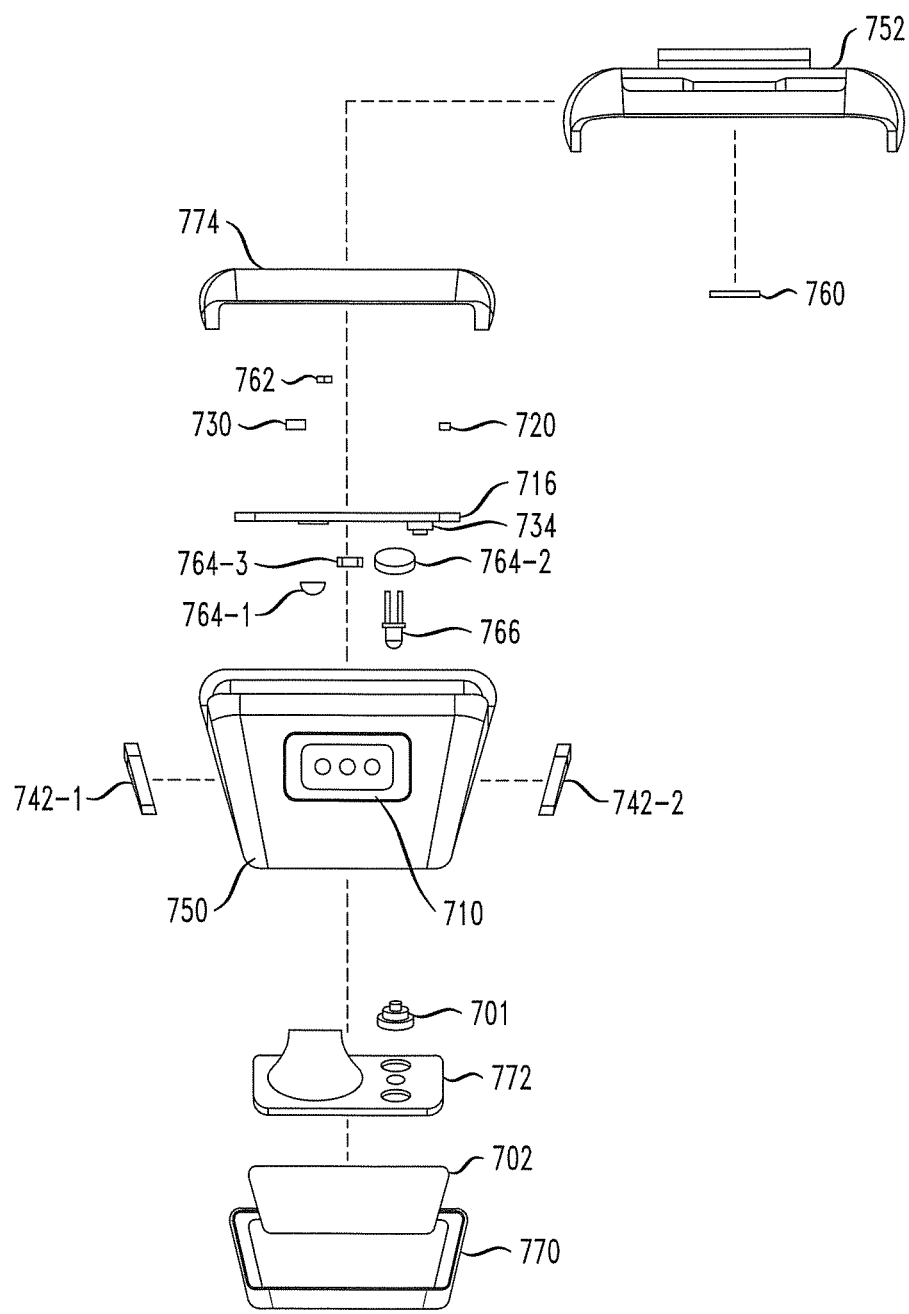
FIG. 7 is a diagram illustrating an exploded view of smart headlamp system hardware components in an example embodiment of the invention.

FIG. 7 is a diagram illustrating an exploded view of smart headlamp system hardware components in an example embodiment of the invention. By way of illustration, FIG. 7 depicts a front bevel component 770, a diffuser panel 702, an LED mount 772 which includes an opening which interfaces with IR-transmissive lens array 701 (e.g., a mid-IR transmissive telescopic lens array), side buttons 742-1 and 742-2, a top button 710, and main assembly 750. FIG. 7 also depicts photo detector 766, main (forward-facing) LED 764-1, red (forward-facing) LED 764-2, red (downward-facing) LED 764-3, at least one IR sensor 734, and PCB 716. Further, FIG. 7 depicts processor 720, IMU 730, hall effect sensor 762, rear housing 774, magnet 760, and ratcheting cradle 752.

Figure 8:
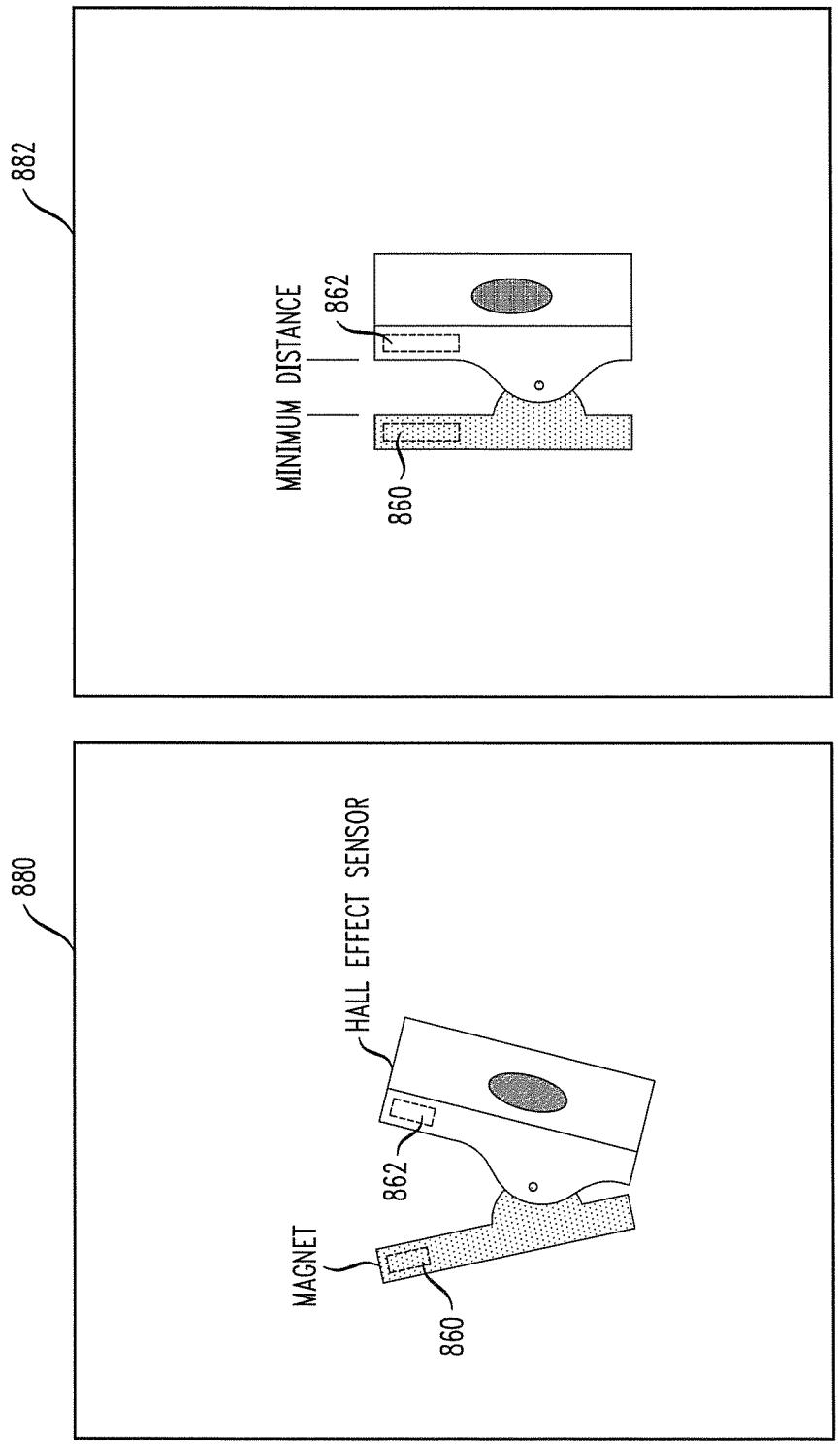
FIG. 8 is a diagram illustrating various use case modalities in an example embodiment of the invention.

FIG. 8 is a diagram illustrating various use case modalities (modes) in an example embodiment of the invention. FIG. 8 depicts use case example 880, which shows an interaction between magnet 860 and hall effect sensor 862. FIG. 8 also depicts use case example 882, which shows an interaction between magnet 860 and hall effect sensor 862 wherein a minimum distance is maintained between the two components.

As further detailed herein, in one or more embodiments of the invention, illumination modality selections can involve user-selected (manual) mode changes or automatic mode changes. With respect to modes, at least one embodiment of the invention can include at least three modes: a LoBeams (or social) mode, a classic (or navigation) mode, and a night vision (or red) mode. As illustrated in more detail in FIG. 10, the classic (navigation (nav)) mode can involve full (or enhanced) brightness from the light source(s) that direct(s) light forward and/or straight-ahead. Additionally, the LoBeams (social) mode can involve redirecting light via one or more lenses (for example, downward-facing lens 612 in FIG. 6) and/or via one or more auxiliary LEDs (for example, red (downward-facing) LED 664-3 in FIG. 6).

Accordingly, in one or more embodiments, such functionality is derived at least in part from the ability of the smart headlamp system to track the angle of the user's head. For instance, if the user is determined and/or presumed to be looking at another person (as inferred by the system detecting that the user has his or her head at approximately a neutral spine position, that is, neither looking very much up nor looking very much down), one or more forward-facing lights (such as, for example, LED 664-1 in FIG. 6) are dimmed or turned-off (to prevent temporarily impairing the vision of that other person).

Figure 9:
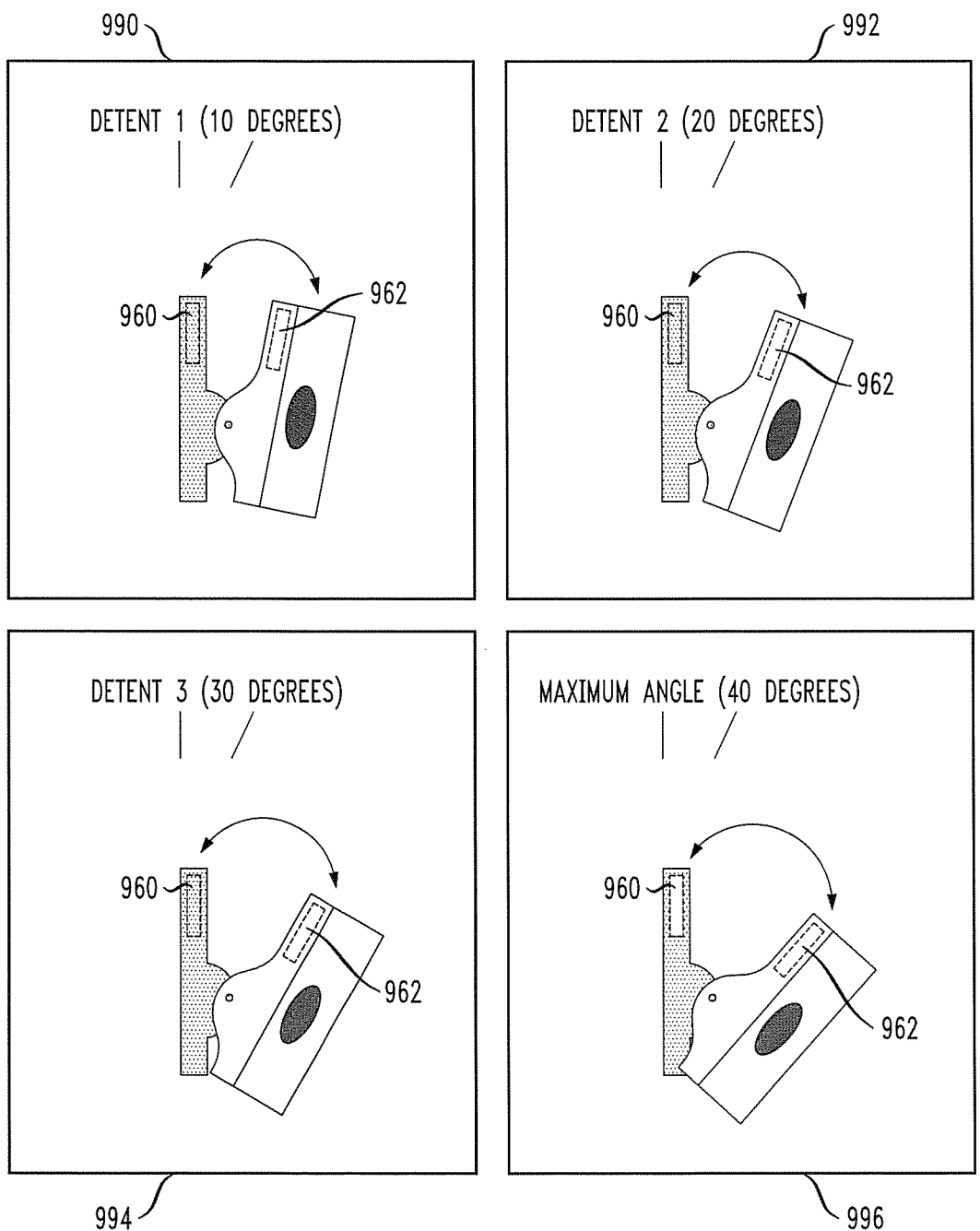
FIG. 9 is a diagram illustrating various use case modalities in an example embodiment of the invention.

FIG. 9 is a diagram illustrating various use case modalities (modes) in an example embodiment of the invention. By way of illustration, FIG. 9 depicts use case example 990, which shows a detent of 10 degrees between magnet 960 and hall effect sensor 962, as well as use case example 992, which shows a detent of 20 degrees between magnet 960 and hall effect sensor 962. Additionally, FIG. 9 depicts use case example 994, which shows a detent of 30 degrees between magnet 960 and hall effect sensor 962, and use case example 996, which shows a detent of a maximum angle size of 40 degrees between magnet 960 and hall effect sensor 962. As illustrated in the FIG. 9 example embodiment, a detent is a device used to mechanically resist or stop the rotation or movement of a separate component. In example FIG. 9 embodiment, the detent is used to intentionally divide the rotation of a headlamp hinge mechanism into discrete increments of approximately ten degrees, for a maximum detent angle of 40 degrees and a minimum detent angle of zero degrees. This means that a user may adjust the angle of the headlamp away from their forehead to any of the five available positions: zero degrees detent, ten degrees detent, twenty degrees detent, thirty degrees tenet, or forty degrees detent.

As detailed herein, and in connection with the example use cases depicted in FIG. 9, one or more embodiments include calculating the angle of tilt of a user's head (wearing the smart headlamp system). For example, if it is determined that a user is facing another individual, the smart headlamp system will switch-off and/or decrease the intensity of one or more main forward-facing LEDs (for example, 664-1 in FIG. 6) and activate and/or increase the intensity of one or more secondary LEDs (for example, 664-3 in FIG. 6). For calculating the angle of tilt of a user's head, at least one embodiment includes using a hall effect sensor (for example, 962 in FIG. 9) and magnet (for example, 960 in FIG. 9) embedded in the smart headlamp system to adjust angle calculations. Accordingly, in one or more embodiments, a user can adjust the smart headlamp system to his or her preferred angle and still utilize the functionalities detailed herein.

Figure 10:
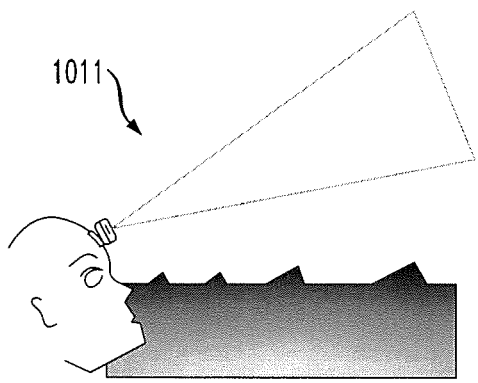
FIG. 10 is a diagram illustrating various use case modalities in an example embodiment of the invention.
Figure 10:
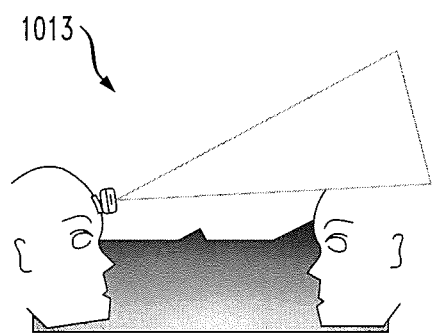
Figure 10:
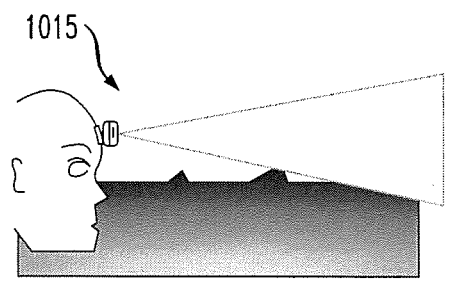
Figure 10:
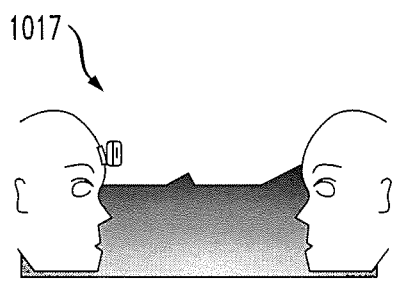
Figure 10:
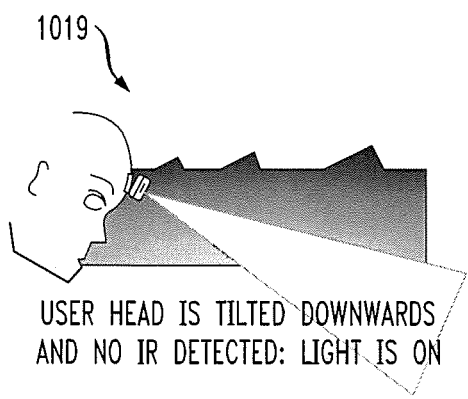
Figure 10:
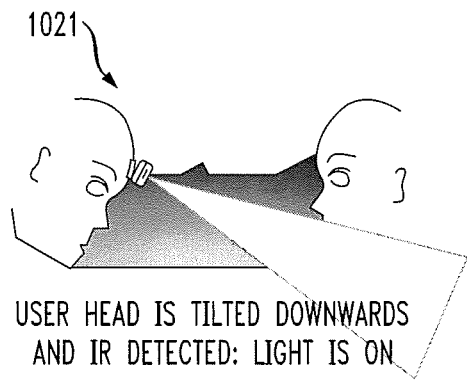

FIG. 10 is a diagram illustrating various use case modalities (modes) in an example embodiment of the invention. By way of illustration, FIG. 10 depicts use case modality 1011, wherein one or more main forward-facing light sources are activated, and wherein the user's head is angled at an upward angle and no IR radiation is detected within the given proximity of the headlamp. In use case modality 1013, one or more main forward-facing light sources are activated, while the user's head is angled at an upward angle and IR radiation is detected within the given proximity of the headlamp. In use case modality 1015, one or more main forward-facing light sources are activated, while the user's head is in a neutral position and no IR radiation is detected within the given proximity of the headlamp.

Additionally, in use case modality 1017, one or more main forward-facing light sources are de-activated, while the user's head is in a neutral position and IR radiation is detected within the given proximity of the headlamp. Further, in use case modality 1019, one or more main forward-facing light sources are activated, while the user's head is angled at a downward angle and no IR radiation is detected within the given proximity of the headlamp. In use case modality 1021, one or more main forward-facing light sources are activated, while the user's head is angled at a downward angle and IR radiation is detected within the given proximity of the headlamp.

In one or more embodiments, LoBeams mode can be activated, for example, via a dedicated button or switch on the smart headlamp system (such as buttons 610, 642-1, 642-2, etc. in FIG. 6). When social mode is activated (e.g., use case modality 1017 in FIG. 10), as noted above, a main forward-facing light can be deactivated and a downward-facing (red) light can be activated, such that the downward-facing light illuminates the user's face and allows another individual to read/visualize facial expressions of the user (if needed).

Additionally or alternatively, there may be instances when a user wearing a smart headlamp system in LoBeams mode will want to override the LoBeams mode without turning off the system altogether. In such a use case, the smart headlamp system can enter an override mode via the user, for example, looking up (that is, tilting his or her head at a sufficient upward angle) for a predefined duration of time. Once the smart headlamp system registers the upward angle, the system will provide feedback (to the user) that override mode has been activated (and the system will act as a conventional headlamp). To exit override mode in such an embodiment, the user can, for example, look down (that is, tilt his or her head at a sufficient downward angle) for a predefined duration of time. Once the smart headlamp system registers the downward angle, the system will provide feedback (to the user) that override mode has been deactivated and the system returns to LoBeams mode.

Also, one or more embodiments can include learning, via application of one or more machine learning techniques, user gesture routines to be used on connection with one or more automated actions. By way of illustration of such an embodiment, consider an example implementation and/or use case where a user (of the smart headlamp system) inputs a sequence of button presses and/or holds, and/or moves the headlamp in a particular sequence of movements to trigger a preset gesture, which triggers the smart headlamp system to activate a learning mode during which the smart headlamp system tracks the movement of the user's head (which can be referred to herein as a "gesture"). After defining this gesture through their his or her movement, the user inputs a button press or a sequence of button presses to exit the learning mode, after which the smart headlamp system saves and/or stores the learned gesture to non-volatile memory (within the smart headlamp system). By way of example, the gesture may be saved as time series data points of one or more of the sensor outputs of the smart headlamp system during the time period during which the device was in learning mode.

When the smart headlamp system is on and not in learning mode, the system can be comparing the current sensor output to the stored time series values, using one or more machine learning techniques to carry out the analysis. When the user performs a gesture that is sufficiently similar to the learned gesture, the smart headlamp system triggers a change in the mode of operation, for example, transitioning from low to high in terms of light output intensity, or transitioning from off to on, or on to off. Additionally, in such an embodiment, multiple gestures can be learned and stored by the smart headlamp system.

In connection with an embodiment such as detailed above, the one or more machine learning techniques can include, for example, a recurrent neural network (RNN) such as an Elman network and/or a Jordan network. Additionally or alternatively, the one or more machine learning techniques can include an artificial feedforward neural network such as, for example, a multilayer perceptron (MLP) network. Further, in such an embodiment, the one or more machine learning techniques can additionally or alternatively include one or more backpropagation through time (BPTT) techniques, one or more long short-term memory (LSTM) networks, and/or a hybrid convolutional neural network and long short-term memory network (CNN-LSTM). With respect to one or more BPTT techniques, an example embodiment can include implementing a truncated BPTT model and constraining the window for user gestural input in the time domain. With respect to one or more LSTM networks, an example embodiment can include implementing a stacked LSTM to process a variety of sensor inputs, and/or implementing a bidirectional LSTM to learn one or more complex gestures and efficiently and reliably classify user inputs. Further, an example embodiment can include implementing a hybrid CNN-LSTM network if significantly more than one IR input pixel is to be processed, wherein such an embodiment can utilize a CNN Model for feature extraction and a LSTM Model for interpreting the features across time steps.

Accordingly, in one or more embodiments of the invention, the LoBeams mode can include turning off and/or decreasing the intensity of the system's high-output LED (also referred to herein as a "high beam") when it is detected that the system is oriented in a particular manner (corresponding with the user's head being tilted at a certain inclination, for example). Also, in at least one embodiment of the invention, LoBeams mode functionality can be manually overridden by a user tilting his or her head on the opposite axis (for example, tilting one's head toward his or her left shoulder or right shoulder to a certain degree), and/or by the user pressing a particular configuration of one or more buttons on the smart headlamp system. Further, in one or more embodiments of the invention, LoBeams mode can be the default mode for the smart headlamp system.

As also detailed herein, in at least one embodiment of the invention, classic mode can include conventional headlamp functionality, and night vision mode can include activation of only a red LED (while deactivating all other LEDs of the smart headlamp system).

Additionally, in one or more embodiments of the invention, classic mode can include a temporal element (for example, a time-out), wherein the smart headlamp system returns to LoBeams mode automatically after the completion of a predetermined temporal period (5 minutes, for example). Further, in one or more embodiments of the invention, classic mode can be manually locked-in by the user. For example, if a user turns on classic mode a second time within a given temporal period (for example 60 seconds) of classic mode automatically expiring and reverting to LoBeams mode, the smart headlamp system will then remain in classic mode until the mode is manually changed by the user. Alternatively and/or additionally, classic mode can be locked-in by the user pressing a particular configuration of one or more buttons on the smart headlamp system.

As also noted above, in one or more embodiments of the invention, the smart headlamp system includes a night vision mode, wherein the user elects for the device to not transmit any white light, and all illumination is derived from one or more red LEDs.

Also, at least one embodiment of the invention can include a mechanism for controlling the brightness of one or more of the light sources of the smart headlamp system. For example, in such an embodiment, holding down the power button for a predetermined period of time (for example more than a few seconds), combined with tilting the smart headlamp system (via the user tilting his or her head, for example), can enable the user to set the brightness of a high-output LED (that is, the brightest light associated with the particular mode—either LoBeams mode or Classic mode) to any one of two or more preset brightness levels.

Also, at least one embodiment can include a halo mechanism, wherein light is diverted downward, illuminating the user's/wearer's face. By way of example, when a user is looking at another person (at a camping situation, a festival situation, etc.), while the user does not want to shine light into the eyes of that other person, it is also likely true that the other person may want to identify the user and/or be able to see the facial expressions of the user. Accordingly, in one or more embodiments of the invention, in LoBeams mode, the smart headlamp system can also, while in the low-light operational setting (for example, when the system detects a head inclination of the user that indicates that the user is looking at another person at eye-level), cast a (soft) light down upon the user's face (that is, the user wearing the smart headlamp). Additionally, in one or more embodiments of the invention, this light cast down upon the user's face can be derived from an additional red LED (that is not turned on during night vision (red) mode). Such a red LED in such an embodiment can automatically be turned on (while the smart headlamp system is in LoBeams mode) when the high-output LED of the smart headlamp is turned off (that is, when the system detects a head inclination of the wearing user that indicates that the user is looking at another person (at eye-level)).

In one or more embodiments of the invention, the smart headlamp system can include one or more photo-sensors that detect the brightness of light. Using such photo-sensors, the smart headlamp can detect the amount and/or intensity of light being directed at the smart headlamp, and if such detected light exceeds a given amount and/or intensity level, the smart headlamp can respond by blinking and/or flashing one or more of the LEDs of the smart headlamp. Such blinking and/or flashing of the one or more LEDs can serve to indicate to another user or individual that a light is being directed at the user's eye-level.

Further, as detailed herein, at least one embodiment includes incorporating one or more pyroelectric detectors and/or sensors into the smart headlamp to detect the likely presence of another human being via detection of IR radiation (e.g., associated with body heat being emitted by another human being) within a given field and/or range of the smart headlamp. Such an embodiment can include precluding the need for the user (i.e., the wearer of the smart headlamp) to manually turn LoBeams mode on and off.

Figure 11:
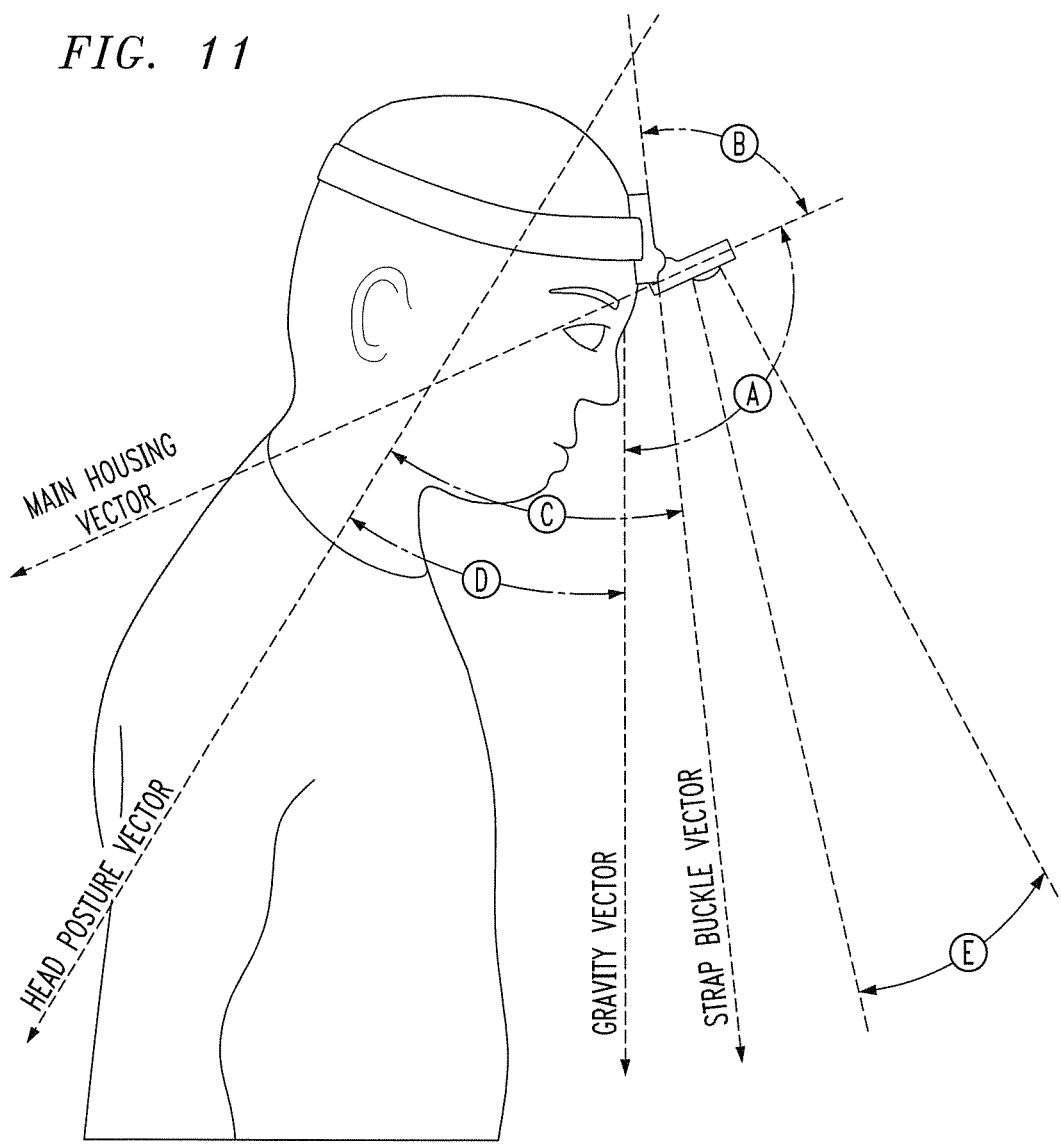
FIG. 11 is a diagram illustrating positions of a smart headlamp system along various vectors in an example embodiment of the invention.

FIG. 11 is a diagram illustrating positions of a smart headlamp system along various vectors in an example embodiment of the invention. By way of illustration, FIG. 11 depicts a user wearing the smart headlamp system. Additionally, FIG. 11 depicts various movement arcs and/or angles along various vectors. Specifically, as depicted by label (A), the IMU of smart headlamp system computes the angle of the main housing of system relative to the gravity vector. Additionally, as depicted by label (B), using a hall effect sensor, the system computes the detent angle of the main housing relative to the strap buckle/headband (affixing system to the user's head). Also, as depicted by label (C), when the user is standing relatively still with a neutral/upright spine (as opposed to bending forward as pictured in FIG. 11), a one-time calibration procedure may be initiated by the user, whereby the calibration procedure stores in memory the angle of the plane of the user's forehead relative to the head posture vector. In one or more embodiments, during such a calibration procedure, the head posture vector and the gravity vector are assumed to be equal. Further, as depicted by label (D), knowing the angles computed via (A), (B), and (C), as detailed above, angle (D) may be calculated, whereby angle (D) is the inclination of the user's head relative to the user's head angle at a neutral spine position. In at least one embodiment, this value, (D), is used for one or more LoBeams mode activations and deactivations, as further described herein. Additionally, label (E) represents the field of view of the primary and/or front facing lighting source(s) of the lighting system/headlamp.

Figure 12:
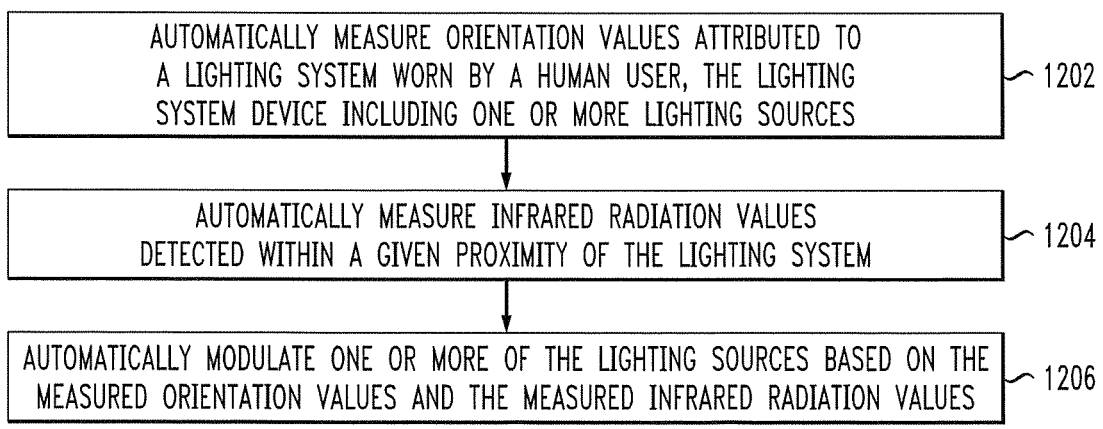
FIG. 12 is a flow diagram of a process for implementing a smart headlamp system using infrared sensing in an example embodiment of the invention.

FIG. 12 is a flow diagram of a process for implementing a smart headlamp system in an example embodiment of the invention. In this embodiment, the process includes steps 1202 through 1204. These steps are assumed to be performed by the processor 120 utilizing its modules 130 and 132.

Step 1202 includes automatically measuring orientation values attributed to a lighting system device worn by a human user, wherein the lighting system device comprises one or more lighting sources and one or more infrared radiation sensors. The orientation values can include, for example, inclination values indicating horizontal movement of the lighting system and/or tilt values indicating vertical movement of the lighting system.

Step 1204 includes automatically measuring infrared radiation values detected within a given proximity of the lighting system device. At least one embodiment additionally includes detecting infrared radiation values within the given proximity of the lighting system device. In one or more embodiments, detecting infrared radiation values can include detecting a specified subset of radiation values (e.g., mid-IR values) within the given proximity of the lighting system device. Also, in at least one embodiment, the given proximity of the lighting system device can include a field of view of a given range extending outward from a frontal portion of the lighting system device in a direction corresponding to a direction of illumination from at least one of the one or more lighting sources. Additionally or alternatively, the given proximity of the lighting system device can include a field of view of at least one of the one or more lighting sources that matches a field of view of at least one of the one or more infrared sensors.

Step 1206 includes automatically modulating one or more of the lighting sources based at least in part on (i) the measured orientation values and (ii) the measured infrared radiation values. Automatically modulating can include, for example, automatically activating one or more of the lighting sources, automatically de-activating one or more of the lighting sources, automatically increasing an intensity level of one or more of the lighting sources, and/or automatically decreasing an intensity level of one or more of the lighting sources. Additionally, in at least one embodiment, automatically modulating can include automatically modulating one or more of the lighting sources upon a determination that the measured orientation values reach at least one predetermined range of angle values. In such an embodiment, the at least predetermined range of angle values can be pre-programmed or user-defined. Further, in one or more embodiments, the predetermined range of angle values can be different for entering social mode than existing social mode. For example, social mode can be deactivated/exited (e.g., high beam light(s) can be activated) when the orientation angle value approximates 30 degrees (that is, when the smart headlamp system user looks down at approximately a 30-degree angle), while the social mode can activated/ entered (e.g., high beam light(s) can be deactivated and a downward facing red auxiliary LED can be activated) when the orientation angle value approximates 20 degrees (that is, when the smart headlamp system user looks up at approximately a 20-degree angle). Such an embodiment aims to avoid inadvertently vacillating between the two modes if the user happens to maintain his or her head angle on the cusp of the relevant degree designation. By configuring a different value for exiting a mode than to enter the mode, flickering and/or related issues can be avoided.

The techniques depicted in FIG. 12 can additionally include enabling user-configuration of one or more intensity levels of one or more of the lighting sources. In one or more embodiments, such enabling of user-configuration of one or more intensity levels of one or more of the lighting sources comprises establishing a mechanism includes (i) engagement of one or more buttons for a predetermined period of time combined with (ii) tilting of the lighting system device within a predetermined angle range.

Also, in at least one embodiment of the invention, an apparatus can include one or more lighting sources, one or more power sources, one or more orientation sensors, one or more infrared radiation sensors, at least one memory, and at least one processor operably coupled to the at least one memory, the one or more orientation sensors, and the one or more infrared radiation sensors. In such an apparatus, the at least one processor is configured for automatically measuring, via the one or more orientation sensors, orientation values attributed to the apparatus; automatically measuring, via the one or more infrared radiation sensors, infrared radiation values detected within a given proximity of the apparatus; and automatically modulating at least one of the one or more lighting sources based on the measured orientation values and the measured infrared radiation values.

In such an apparatus, the one or more lighting sources can include one or more narrow beam lighting sources, one or more wide beam lighting sources, one or more medium beam lighting sources, one or more red light lighting sources, one or more white light lighting sources, and/or one or more light diffusers. Additionally, in such an apparatus, the one or more power sources can include one or more batteries, and the one or more orientation sensors can include one or more gyroscopes, one or more magnetometers, one or more hall effect sensors, and/or one or more accelerometers (which can include one or more single axis accelerometers, one or more dual axis accelerometers, and/ or one or more triple axis accelerometers). Further, such an apparatus can include one or more angle sensors. In one or more embodiments, the one or more angle sensors can include one or more hall effect sensors (and wherein, in such an embodiment, the apparatus further includes one or more magnets), one or more encoders, one or more mechanical switches, a series of reed switches, one or more optical sensors (e.g., IR reflectance and/or time of flight), etc. In such an embodiment, the one or more orientation sensors can be implemented within a main housing that may be rotated relative to a ratcheting cradle, bracket, strap, or other headpiece (e.g., a helmet mount), and the one or more angle sensors enables determination of the difference between (i) the ratcheting cradle, bracket, strap, or other headpiece and (ii) the rotated main housing.

Additionally, in at least one embodiment, the one or more orientation sensors include multiple orientation sensors, and wherein at least a first of the multiple orientation sensors measures an angle of the apparatus relative to a forehead of a user of the apparatus, and wherein at least a second of the multiple orientation sensors measures an angle of the apparatus relative to gravity.

Also, in such an apparatus, the one or more infrared radiation sensors can include two or more infrared radiation sensors that include (i) at least one infrared radiation sensor sensing in a fixed forward-facing directionality, with respect to the apparatus, regardless of directionality of the one or more lighting sources; and (ii) at least one infrared radiation sensor sensing within a field of view that matches a field of view of at least one of the one or more lighting sources. Additionally or alternatively, the one or more infrared radiation sensors can include a matrix of two or more infrared radiation sensors and/or an array of two or more thermal sensors.

Further, in one or more embodiments, such an apparatus can additionally include one or more manual haptic input mechanics, one or more headband components, and/or one or more voltage regulators.

Other techniques can be used in association with one or more embodiments of the invention. Accordingly, the particular processing operations and other functionality described in conjunction with FIG. 12 are presented by way of illustrative example only, and should not be construed as limiting the scope of the invention in any way. For example, the ordering of the process steps may be varied in one or more other embodiments of the invention, or certain steps may be performed concurrently with one another rather than serially.

The above-described example embodiments of the invention provide significant advantages relative to conventional approaches. For example, one or more embodiments of the invention can include automatically modifying the intensity level of light being emitted by a headlamp based on the head inclination of the wearing user, facilitating interactions with other individuals as well as activities not involving other humans.

It is to be appreciated that the foregoing advantages are illustrative of advantages provided in certain embodiments, and need not be present in other embodiments.

It should again be emphasized that the embodiments of the invention described herein are presented for purposes of illustration only. Many variations may be made in the particular arrangements shown. Moreover, the assumptions made herein in the context of describing one or more illustrative embodiments of the invention should not be construed as limitations or requirements of the invention, and need not apply in one or more other embodiments of the invention. Numerous other alternative embodiments within the scope of the appended claims will be readily apparent to those skilled in the art.

What is claimed is:

1. A computer-implemented method, the method comprising:
    automatically measuring orientation values attributed to a lighting system device worn by a human user, wherein the lighting system device comprises one or more lighting sources and one or more infrared radiation sensors, wherein said automatically measuring orientation values comprises:
        automatically determining a first angle between at least a portion of a first component of the lighting system device and at least a portion of second component of the lighting system device; and
        automatically calculating a second angle attributed to the lighting system device based at least in part on the determined first angle and an angle attributed to the lighting system device based on positioning of at least a portion of the human user wearing the lighting system device;
    detecting, using at least a portion of the one or more infrared radiation sensors, infrared radiation values within a given proximity of the lighting system device, wherein detecting infrared radiation values comprises detecting, within the given proximity of the lighting system device, a specified subset of infrared radiation values associated with body heat emitted by at least one human other than the human user;
    automatically measuring at least a portion of the infrared radiation values detected within the given proximity of the lighting system device; and
    automatically modulating one or more of the lighting sources based at least in part on (i) the measured orientation values and (ii) the measured infrared radiation values;
    wherein the method is carried out by at least one computing device.

2. The computer-implemented method of claim 1, wherein the given proximity of the lighting system device comprises a field of view of a given range extending outward from a frontal portion of the lighting system device in a direction corresponding to a direction of illumination from at least one of the one or more lighting sources.

3. The computer-implemented method of claim 1, wherein the given proximity of the lighting system device comprises a field of view of at least one of the one or more lighting sources that matches a field of view of at least one of the one or more infrared sensors.

4. The computer-implemented method of claim 1, wherein the orientation values comprise at least one of inclination values indicating horizontal movement of the lighting system and tilt values indicating vertical movement of the lighting system.

5. The computer-implemented method of claim 1, wherein automatically modulating comprises automatically activating one or more of the lighting sources.

6. The computer-implemented method of claim 1, wherein automatically modulating comprises automatically de-activating one or more of the lighting sources.

7. The computer-implemented method of claim 1, wherein automatically modulating comprises automatically increasing an intensity level of one or more of the lighting sources.

8. The computer-implemented method of claim 1, wherein automatically modulating comprises automatically decreasing an intensity level of one or more of the lighting sources.

9. The computer-implemented method of claim 1, wherein automatically modulating comprises automatically modulating one or more of the lighting sources upon a determination that the measured orientation values reach at least one range of angle values.

10. An apparatus comprising:
    one or more lighting sources;
    one or more power sources;
    one or more orientation sensors;
    one or more infrared radiation sensors;
    at least one memory; and
    at least one processor operably coupled to the at least one memory, the one or more orientation sensors, and the one or more infrared radiation sensors, wherein the at least one processor is configured for:

automatically measuring orientation values attributed to the apparatus, wherein said automatically measuring orientation values comprises:
    automatically determining a first angle between at least a portion of a first component of the apparatus and at least a portion of second component of the apparatus; and
    automatically calculating a second angle attributed to the apparatus based at least in part on the determined first angle and an angle attributed to the apparatus based on positioning of at least a portion of a human user wearing the apparatus;
detecting, using at least a portion of the one or more infrared radiation sensors, infrared radiation values within a given proximity of the apparatus, wherein detecting infrared radiation values comprises detecting, within the given proximity of the apparatus, a specified subset of infrared radiation values associated with body heat emitted by at least one human other than the human user;
automatically measuring at least a portion of the infrared radiation values detected within the given proximity of the apparatus; and
automatically modulating at least one of the one or more lighting sources based at least in part on (i) the measured orientation values and (ii) the measured infrared radiation values.

11. The apparatus of claim 10, wherein the one or more infrared radiation sensors comprise two or more infrared radiation sensors comprising:
    at least one infrared radiation sensor sensing in a fixed forward-facing directionality, with respect to the apparatus, regardless of directionality of the one or more lighting sources; and
    at least one infrared radiation sensor sensing within a field of view that matches a field of view of at least one of the one or more lighting sources.

12. The apparatus of claim 10, wherein the one or more infrared radiation sensors comprise a matrix of two or more infrared radiation sensors.

13. The apparatus of claim 10, wherein the one or more infrared radiation sensors comprise an array of two or more thermal sensors.

14. The apparatus of claim 10, wherein the one or more lighting sources comprise at least one of (i) one or more narrow beam lighting sources, (ii) one or more wide beam lighting sources, (iii) one or more medium beam lighting sources, (iv) one or more red light lighting sources, and (v) one or more white light lighting sources.

15. The apparatus of claim 10, wherein the one or more orientation sensors comprise at least one of one or more accelerometers, one or more gyroscopes, and one or more magnetometers.

16. The apparatus of claim 15, wherein the one or more accelerometers comprise at least one of (i) one or more single axis accelerometers, (ii) one or more dual axis accelerometers, and (iii) one or more triple axis accelerometers.

17. The apparatus of claim 10, further comprising:
one or more angle sensors.

18. A non-transitory processor-readable storage medium having stored therein program code of one or more software programs, wherein the program code when executed by at least one processing device causes the at least one processing device:
    to automatically measure orientation values attributed to a lighting system device worn by a human user, wherein the lighting system device comprises one or more lighting sources and one or more infrared radiation sensors, wherein said automatically measuring orientation values comprises:
        automatically determining a first angle between at least a portion of a first component of the lighting system device and at least a portion of second component of the lighting system device; and
        automatically calculating a second angle attributed to the lighting system device based at least in part on the determined first angle and an angle attributed to the lighting system device based on positioning of at least a portion of the human user wearing the lighting system device;
    to detect, using at least a portion of the one or more infrared radiation sensors, infrared radiation values within a given proximity of the lighting system device, wherein detecting infrared radiation values comprises detecting, within the given proximity of the lighting system device, a specified subset of infrared radiation values associated with body heat emitted by at least one human other than the human user;
    to automatically measure at least a portion of the infrared radiation values detected within the given proximity of the lighting system device; and
    to automatically modulate one or more of the lighting sources based at least in part on (i) the measured orientation values and (ii) the measured infrared radiation values.

* * * * *